Feb. 4, 1930.  C. P. FAY  1,745,411
TONGS
Filed May 18, 1927
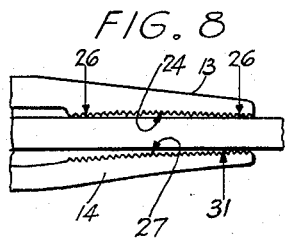
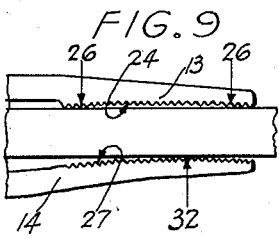
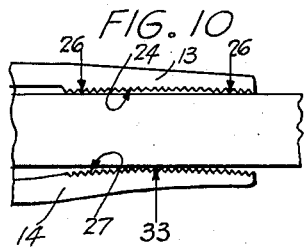
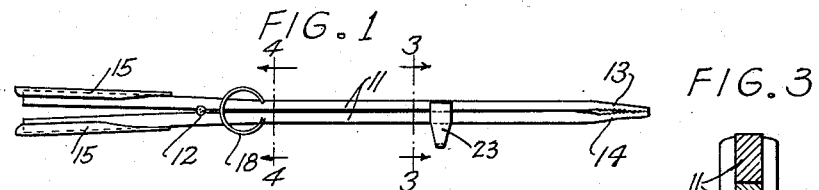
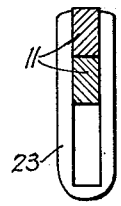
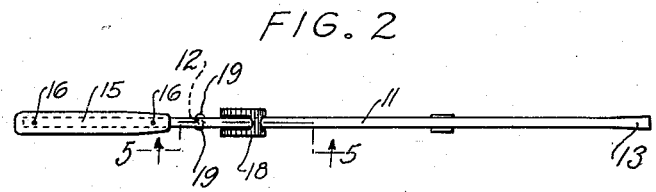
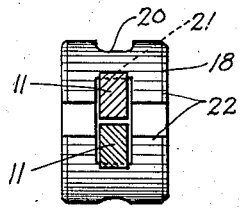
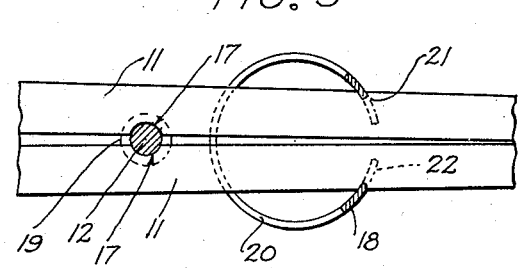
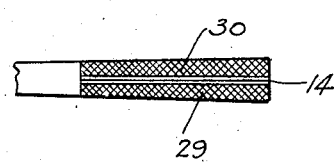
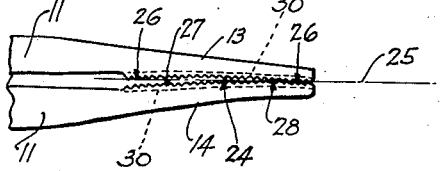
INVENTOR.
Charles P. Fay
BY Chapin & Neal
ATTORNEYS.

Patented Feb. 4, 1930

1,745,411

UNITED STATES PATENT OFFICE

CHARLES P. FAY, OF SPRINGFIELD, MASSACHUSETTS

TONGS

Application filed May 18, 1927. Serial No. 192,440.

This invention relates to improvements in tongs and, while the invention is capable of general application, it finds one advantageous use as a means for handling and holding articles of various sizes and shapes during heat treatment.

Ordinary tongs are adapted to securely hold one thickness of work only. Since their jaws are pivotally connected, there will be only one position in which the work engaging faces of the jaws are parallel. The jaws, when separated to a greater or less extent, will engage the work at two points only and as a result the work is not securely gripped. Therefore, it is customary to provide a large number of tongs one for each thickness of work to be handled.

This invention has for an object to so construct the work engaging faces of the jaws that they will securely grip work of all thicknesses throughout the range of relative swinging movement of the jaws.

In carrying out this object, the work engaging face of one jaw is made longitudinally convex and the corresponding face of the other jaw is made longitudinally concave. That is, the concavity and convexity is in the direction of the length of the jaws rather than crosswise thereof. In this way the concave jaw has two points of contact with the work, one near each end of the jaw, and the convex jaw has one point of contact with the work whereby the work may be securely held. The later point of contact is always intermediate the first named points of contact but shifts longitudinally of the jaw as work of different thicknesses is grasped.

Another object of the invention is to provide a generally simplified and improved tongs of the type in which the jaws are automatically held closed or in gripping relation with the work.

Other objects and advantages will appear in the following description and will be pointed out in the appended claim.

The invention will be disclosed with reference to the accompanying drawings, in which:—

Figs. 1 and 2 are side elevational and top plan views of tongs embodying the invention;

Figs. 3 and 4 are cross sectional views taken on the lines 3—3 and 4—4, respectively, of Fig. 1;

Fig. 5 is a fragmentary sectional elevation taken on the line 5—5 of Fig. 2;

Fig. 6 is a fragmentary side elevational view, drawn to a larger scale and showing in detail the construction of the jaws;

Fig. 7 is a plan view showing the work engaging face of one jaw; and

Figs. 8, 9 and 10 are views taken similarly to Fig. 6 and illustrating the manner in which the jaws grip work of various thicknesses.

Referring to these drawings; the tongs include two legs 11 which are pivoted intermediate their ends at 12. These legs are each formed from a length of bar stock of rectangular construction (Fig. 3). These two legs are substantially straight and parallel (when the jaws are closed) except that they are drawn down at one end to form the jaws 13 and 14 and except that they are bent slightly from the pivot point 12 to their other ends in outwardly diverging relation. Those parts of the legs which are thus bent in outwardly diverging relation form the handles and handle pieces 15 may be secured thereto by the screws 16 shown. It is to be noted that the pivot 12 is located close to the handles and remote from the jaws.

The legs 11 are pivotally connected as best shown in Fig. 5. In each of the inner and adjacent faces of legs 11, a recess 17 is formed to receive the fulcrum pin 12. Adjacent the pivot pin but on the jaw side thereof, a spring 18 is located and this spring not only holds the jaws closed but also presses the legs inwardly toward each other and holds the walls of recesses 17 in bearing engagement with the fulcrum pin 12. The latter, at each end has a flange 19 and each leg closely fits between these two flanges, whereby the legs and pivot pin are securely held against relative lateral displacement. The spring 18 is nearly circular in form and its body is slotted as at 20, to permit the legs 11 to pass therethrough and also to afford freedom for the necessary relative swinging movement thereof. The legs are notched, as at 21, to receive the ends of the spring 18 and these ends have side flanges 22 to prevent sidewise displacement of these ends to an extent sufficient to cause them to ride out of the notches 21. Between the spring and jaws, a guide is provided in the shape of a U-shaped piece 23, the free ends of which are secured to one leg 11 and the cross bar portion of which is adapted to be engaged by the other leg 11 as a stop to limit the extent of the relative swinging movement of the legs.

Referring to Fig. 6, the work engaging face 24 of jaw 13 is made concave as will be clearly apparent with reference to the dot-dash line 25. This concavity is longitudinal as distinguished from transverse. That is, if a straight edge is laid lengthwise against the work engaging face 24, it will contact with said face at two points, such as these designated by the arrows 26. The work engaging face 27 of jaw 14 is made longitudinally convex and a straight edge if laid lengthwise against this face would rock since it can engage the face at one point only. The jaws 13 and 14 are so fashioned that, when closed, they engage at a point close to their outer ends, say that designated by the arrow 28. The faces 24 and 27 are preferably serrated or roughened as indicated at 29 in Fig. 7 in connection with jaw face 27. Also each of the faces 24 and 27 may have a longitudinally extending, V-shaped groove 30 therein or be otherwise so fashioned as to adapt the tongs to grip and hold other shapes than the flat shapes which are held by the serrated parts of the jaws. These grooves 30 are preferably made to correspond in curvature with the faces in which they are formed. That is, the groove in jaw 13 is made longitudinally concave and parallels face 24 while the groove in jaw 14 is made longitudinally convex and parallels face 27.

In operation, the jaws 13 and 14 are normally closed and have to be manually held open by pressure on the handles 15. When the pressure on the latter is relaxed, the strong spring 18 forces the jaws together to clamp the work placed therebetween. The work, irrespective of its thickness, is always engaged at three points notwithstanding the variation in angularity of separation of the legs 11 resulting from variations in degree of jaw opening. This is illustrated in Figs. 6, 8, 9 and 10. The work, if fully inserted in the jaws will be engaged at the points 26 by the face 24 of jaw 13 and at one point by the face 27 of jaw 14. The point at which face 27 engages the work varies in location longitudinally of jaw 14 according to the thickness of the work being gripped. For very thin articles, such as thin sheets, the point of engagement is near the outer end of jaw 14, at or about the location shown at 28 in Fig. 6. As the work gripped increases in thickness the contact point of jaw 14 moves away from the outer end of the jaw as illustrated by the arrows 31, 32 and 33 in Figs. 8, 9 and 10, respectively. As shown, the tongs will handle a wide range of work and, in the particular embodiment illustrated articles varying from paper thickness up to three quarters of an inch in thickness can be securely gripped and held by the tongs. Aside from the construction of the jaws, the tongs are simple in construction and of a construction which lends itself to quantity production manufacture. The legs 11 are simply lengths of standard bar stock and the jaws may be formed thereon by drop forging. Aside from this, the legs 11 require merely the bending in the handle portions and the notching for the spring and fulcrum pin. The spring and guide and handle pieces are parts which can be readily made in quantities at low unit cost. The construction nevertheless is such as to result in not only attractive looking tongs but also rugged and durable ones calculated to have a long useful life notwithstanding the rough treatment which they receive in practical use.

The invention has been disclosed herein, in an embodiment at present preferred, for illustrative purposes but the scope of the invention is defined by the appended claims rather than by the foregoing description.

What I claim is:

Tongs comprising, two uncrossed and substantially straight bars pivotally connected together and provided at one end with handles and at the other end with confronting jaws, resilient means tending to hold said jaws closed and the handles spread, said bars between the pivot point and jaw end being substantially straight and in parallel and closely adjacent relation when the jaws are closed and the remainder of the bars at such time diverging from the pivot point at a small angle to permit a relatively small angular movement of the jaws, the point of pivotal connection between said bars being much nearer to the handle end of said bars than to the other end, said jaws being formed integrally with the bars and having work engaging faces which are curved in a longitudinal direction on a radius of such length with relation to the range of swinging movement of the jaws that such faces deviate only slightly from parallel relation throughout such range, one of said faces being longitudinally concave and the other longitudinally convex, such faces when the jaws are closed engaging near the outer ends of the jaws and diverging slightly in a direction towards said pivotal connection.

In testimony whereof I have affixed my signature.

CHARLES P. FAY.